March 31, 1953  H. L. KRAEFT  2,633,379
JUVENILE VEHICLE BODY CONSTRUCTION
Filed Sept. 8, 1949
2 SHEETS—SHEET 1
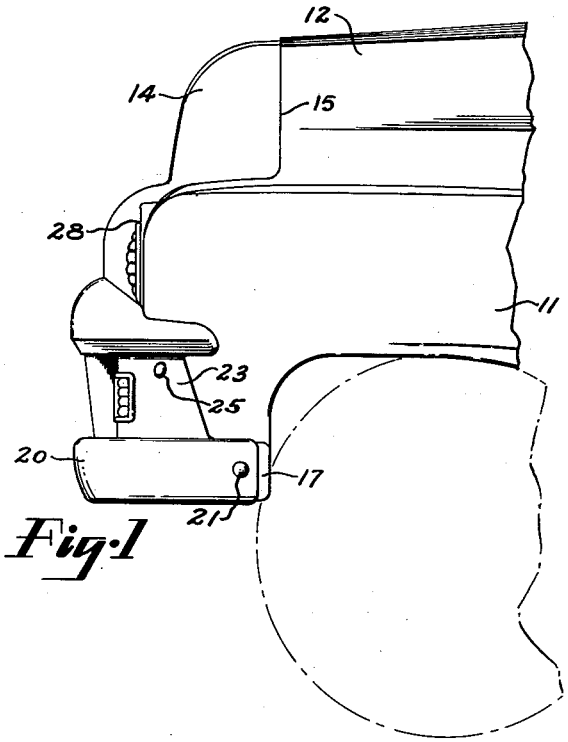
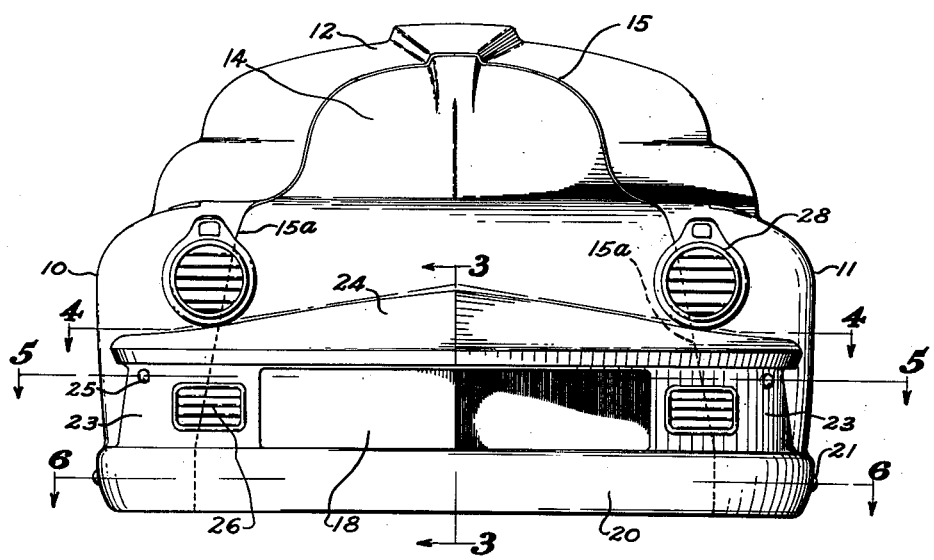
INVENTOR.
HERMAN L. KRAEFT
BY Fay, Golrick & Fay
ATTORNEYS March 31, 1953 H. L. KRAEFT 2,633,379
JUVENILE VEHICLE BODY CONSTRUCTION
Filed Sept. 8, 1949 2 SHEETS—SHEET 2
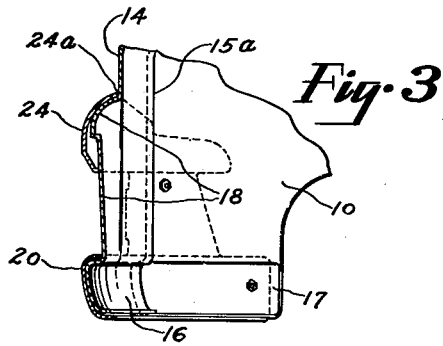
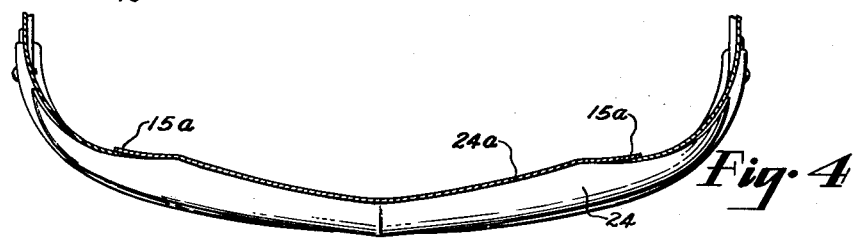
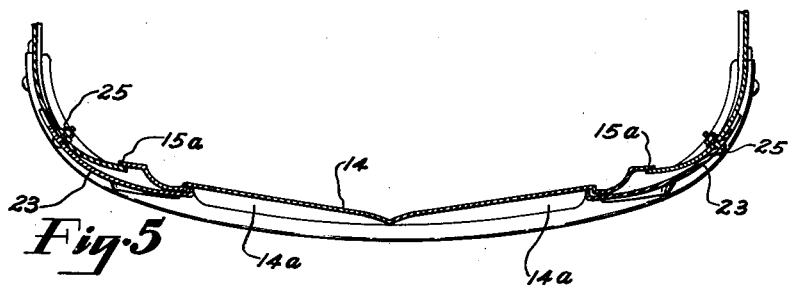
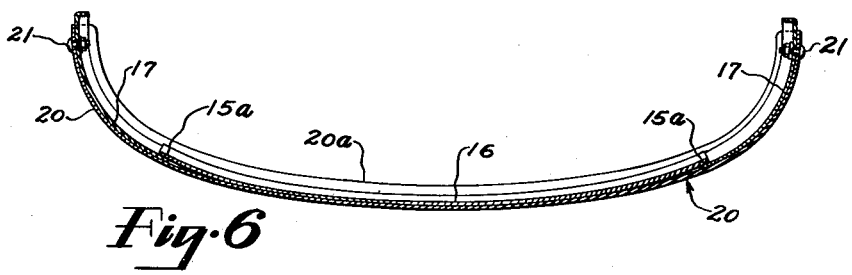
INVENTOR.
HERMAN L. KRAEFT
BY Fay, Golrick & Fay
ATTORNEYS Patented Mar. 31, 1953

2,633,379

UNITED STATES PATENT OFFICE 2,633,379

JUVENILE VEHICLE BODY CONSTRUCTION

Herman L. Kraeft, Cleveland Heights, Ohio, assignor to The Murray-Ohio Manufacturing Company, Cleveland, Ohio, a corporation of Ohio Application September 8, 1949, Serial No. 114,576

1 Claim. (Cl. 296—28)

This invention is directed to improvements in juvenile vehicles and particularly of the pedal operated juvenile automobile type wherein the child rides.

In my co-pending application Serial No. 114,575 filed on even date herewith I have disclosed a juvenile auto body construction wherein bumper formations are formed in the sheet metal panels comprising the front, rear and side structures of the body at the time these members are being otherwise formed in the press. The bumper formations add considerably to the strength of the lower regions of those members. The construction there disclosed is conducive to economical production. However, since the bumper formations are integral portions of the main body members only a mill bright or a steel polish finish is possible but not practical since the amount of surface marking required to finish the body would increase the finishing costs too much. To plate a nickel or chrome finish to the bumper portions would be prohibitive for the same reason. Accordingly, the bumper portions and grill formation usually are finished with a metal paint such as a bright flake aluminum coating. Such has been found to be acceptable in the lower priced vehicles despite the tendency of metal paint finishes to scratch and nick and eventually darken.

The present invention contemplates the obtaining of a chrome finished bumper structure arranged fore and aft of the body structure which not only will enhance the appearance of the vehicle but will add still further strength to the bumper formations of the body structure. The manner of accomplishing this is such that I also can include a chrome finished grill frame to fit the front panel of the vehicle, thereby increasing its strength. I thus produce a vehicle of a higher class and price while utilizing the body structure of the cheaper vehicle in such a way as to materially increase the strength of the front and rear panels of the body structure.

Accordingly, the general object of the present invention is the provision of a manner of reinforcing the front and rear regions of a juvenile vehicle body formed of drawn sheet metal parts which also will enhance the appearance of the vehicle body.

More specifically, the purpose of the present invention is the provision of front and rear bumper constructions which become part of the body structure per se.

Other objects and advantages of the invention will be apparent from the following detailed description of preferred forms of embodiment of the invention, reference being made to the accompanying drawings wherein—

Figure 1 shows the front part of a juvenile body structure in side elevation and incorporating the features of my invention;

Figure 2 is a front elevation of the body structure shown in Figure 1;

Figure 3 is a cross-sectional elevation of the bumper structure shown in body structure of Figs. 1 and 2 and is taken substantially along the line 3—3 of Figure 2;

Figure 4 is a cross-sectional plan view of the front bumper and body front construction, as taken along the line 4—4 of Figure 2;

Figure 5 is a cross-sectional plan view of the front bumper and body front construction, as taken along the line 5—5 of Figure 2; and Figure 6 is a cross-sectional plan view of the front bumper and body front construction, as taken along the line 6—6 of Figure 2.

In my co-pending application I have shown complete details of the body construction to which my present invention is adapted to be applied and have shown here only the front structure of the vehicle body although it is to be understood that the present invention contemplates the use thereof upon the rear structure of the vehicle body as readily as it is applied to the front thereof and which will be apparent from the following description of an embodiment thereof. In the vehicle body referred to the side walls thereof comprise drawn sheet metal formations extending in a continuous manner from the front to the back of the vehicle body with integral front and rear fender formations. These front and rear fender formations are connected by front and rear sheet metal panels drawn in the press to conform, at the fender connecting margins thereof, to the contours of the joining parts of the fender shapes. The panels and the fender parts have bumper formations bulging outwardly along the lower portions or margin thereof, the bulges being coincidentally formed in each panel and associated fender parts.

Reefrring to the drawings, and particularly Figures 1 and 2, the body front structure comprises left and right side structures 10 and 11, respectively, a hood formation 12 and a drawn front panel 14 fashioned to be a domed front terminus of the hood as well as the grill part of the body front extending downwardly to the bottoms of the fender formations. For the purposes of the present invention the hood may be a separately drawn panel attached longitudinally to the side structures, or it may be an integral part of metal sheet out of which the side structures are drawn. In the drawings, the hood 12 is shown as a formation integral with the side wall formations.

The front panel 14 is so formed as to be lap joined with the hood structure 12 along an arcuate seam 15 and to the front fender formations along irregular continuations 15ª of the seam 15 in a generally vertical direction, as shown by the dotted lines in Figures 2 and 3.

The lower end of the panel member 14 has an outwardly struck or drawn bulging portion 16 which matches or coincides with bumper portions 17 formed at the bottom margins of the front fender formations. The front panel 14 may also have an imitation grill formation 18 struck or drawn outwardly above the bumper formation 16 of the front panel member 14, which formation 18 may be of any desired outline, but not exceeding in proportion the forwardly projecting bumper formation.

The foregoing is generally a description of the front end construction of the vehicle body of my co-pending application from which it can be seen that the seams 15ª are exposed all the way down the front of the body. To fulfill the purposes of the present invention I form a one-piece bumper member 20, to have the inner surface thereof conform to the faces of the bumper formations 16 and 17 of the front panel and fenders thereby to fit thereover in a complementary manner. This is best shown in Figure 6 where it will be noted the bumper member 20 has an inwardly extending lower flange 20ª of greater width than the bottom flanges of the bumper formations 16 and 17. Also, it will be noted that this one-piece bumper extends completely around the front and forward side parts of the fenders and also spans the seams 15ª.

The bumper member 20 in vertical cross-section conforms, in a complementary manner, to the vertical cross-sections of the bumper formations 16 and 17 and is held in the reinforcing position shown by round head bolts 21, although rivets may be used if desired. In so far as primary and secondary bumper construction is concerned, the rear panel and rear fender formations may be as shown in Figures 1, 2, 3 and 6.

If further strengthening of the front panel 14 and further decorative effect is desired the front bumper 20 may have a grill frame part formed integral therewith which will have the inner face or inner edges thereof shaped to conform to the contour of the face of the front panel. As shown in the drawings, upwardly extending portions 23 have a top canopy or bridging portion 24 ornamentally shaped to frame the imitation grill work 18, formed in the face of the front panel 14. As shown in Figures 4 and 5 the metal portions 23 and 24 are also shaped to conform to the contours of the front panel member and the forward end portions of the fenders. Rivets or bolts 25 secure this upper structure to the fender fronts and, if desired, to the panel 14. As shown in Fig. 4 the ornamentally curved top 24 has the curved-in edges 24ª thereof trimmed to fit the contour of the grill formation 18 of the front panel 14 and the portions 23 curve around a substantial part of the fronts of the fenders.

It is obvious that further ornamentation can be added, as for example the simulated parking lights 26 stamped in the portions 23 which would be separate from the headlights 28. Thus this added feature of having the front bumper also constitute a front grill frame of practical dimensions to afford polishing and plating of the outer surfaces thereof without subsequent involvement in body spraying or coating operations also has the merit of providing a means of reinforcing and protecting the entire front of the panel member 14 and the forward ends of the fenders against even extreme abuse.

I claim:

In a sheet metal juvenile body construction comprising drawn sheet metal side structures consisting of integral front and rear fender formations formed in continuous side walls extending from the rear end to the front end of the vehicle and front and rear panel members seam connected to the front and rear ends of the fender formations and there being integral bumper formations bulged outwardly in the lower regions of the panel and the fender formations; a second bumper structure complementary in shape to the bumper bulges of the panels and of the fenders and means securing the fender bumper and panel bumper formations to the second bumper structure whereby the second bumper structure spans the seam connections between the fender and panels.

HERMAN L. KRAEFT.

REFERENCES CITED

The following references are of record in the file of this patent:

UNITED STATES PATENTS

| Number | Name | Date |
| --- | --- | --- |
| D. 153,266 | Darrin | Apr. 5, 1949 |
| D. 160,522 | Nickles | Oct. 17, 1950 |
| 2,034,824 | Nelson | Mar. 24, 1936 |
| 2,036,813 | Kraeft | Apr. 7, 1936 |
| 2,074,469 | Haynes | Mar. 23, 1937 |
| 2,084,694 | Martin | June 22, 1937 |
| 2,104,182 | Best | Jan. 4, 1938 |
| 2,329,874 | Cadwallader et al. | Sept. 21, 1943 |